(12) United States Patent
Fernandez (10) Patent No.: US 11,325,628 B1
(45) Date of Patent: May 10, 2022

(54) SYSTEMS, DEVICES, AND/OR METHODS FOR MANAGING DOLLIES

(71) Applicant: Eric Albert Fernandez, Waynesboro, VA (US)

(72) Inventor: Eric Albert Fernandez, Waynesboro, VA (US)

( * ) Notice: Subject to any disclaimer, the term of this patent is extended or adjusted under 35 U.S.C. 154(b) by 0 days.

(21) Appl. No.: 17/214,881

(22) Filed: Mar. 28, 2021

Related U.S. Application Data (60) Provisional application No. 63/009,929, filed on Apr. 14, 2020.

(51) Int. Cl.
*B62B 5/00* (2006.01)
*B62B 3/00* (2006.01)

(52) U.S. Cl.
CPC ........ *B62B 5/0093* (2013.01); *B62B 2301/05* (2013.01); *B62B 2301/08* (2013.01); *B62B 2301/254* (2013.01)

(58) Field of Classification Search
CPC ... B62B 5/0093; B62B 3/007; B62B 2301/05; B62B 2301/08; B62B 2301/254
USPC .......................................................... 280/79.11
See application file for complete search history.

(56) References Cited

U.S. PATENT DOCUMENTS

| | | | |
|---|---|---|---|
| 8,534,685 B1 * | 9/2013 | Tohm, Sr. ............... | B60B 33/08 280/87.021 |
| 9,937,751 B2 * | 4/2018 | Boyl-Davis ............... | B62B 3/02 |

\* cited by examiner

*Primary Examiner* — John D Walters
(74) *Attorney, Agent, or Firm* — Dale Jensen, PLC; Dale Jensen (57) ABSTRACT

Certain exemplary embodiments can provide a dolly comprising a frame, a set of guide rollers, a planetary disc, a set of rollers, and a caster. The frame comprises a plurality of cells. The set of guide rollers is coupled to the frame. The planetary disc constrained within a cell of the plurality of cells via the guide rollers. The set of rollers is coupled to the cell of the plurality of cells. Each of the plurality of rollers contacts a surface of the planetary disc. The set of rollers is constructed to distribute a load placed on the dolly over a surface of the planetary disc, thereby reducing a probability of failure of the dolly. The caster is coupled to the planetary disc.

8 Claims, 14 Drawing Sheets

SYSTEMS, DEVICES, AND/OR METHODS FOR MANAGING DOLLIES

CROSS-REFERENCES TO RELATED APPLICATIONS

This application claims priority to, and incorporates by reference herein in its entirety, U.S. Provisional Patent Application Ser. No. 63/009,929, filed Apr. 14, 2020.

DETAILED DESCRIPTION

Certain exemplary embodiments can provide a dolly comprising a frame, a set of guide rollers, a planetary disc, a set of rollers, and a caster. The frame comprises a plurality of cells. The set of guide rollers is coupled to the frame. The planetary disc is constrained within a cell of the plurality of cells via the guide rollers. The set of rollers is coupled to the cell of the plurality of cells. Each of the plurality of rollers contacts a surface of the planetary disc. The set of rollers is constructed to distribute a load placed on the dolly over a surface of the planetary disc, thereby reducing a probability of failure of the dolly. The caster is coupled to the planetary disc.

Dollies transport loads short distances by human effort on relatively smooth terrain. The maximum load that can be handled by three people with a dolly, due to friction/inertia, is approximately 3,000 pounds placed on two dollies. So, a dolly is a device, which can support approximately 1,500 pounds and travel on relatively smooth surfaces (e.g., asphalt surfaces) a short distance while facilitating changes of direction. Certain exemplary embodiments provide systems with workable static or dynamic friction relative to movement or changes in direction. Loads greater than approximately 3,000 pounds are typically moved via forklifts instead of dollies.

Certain exemplary dollies have a caster bearing located on top of the wheel. The geometry creates an overhung load on that bearing, which can cause the caster bearing to bind. Resistance to changes of direction occur, followed by stress, and potentially breakage, of one or more of a fork, wheel, and/or caster bearing, as an operator pushes harder to turn. The combination of off-center loading, and the desire to turn smoothly, has lead to the use of open & greased ball bearings; these are susceptible to dirt, and decaying reliability. In such casters, bronze, acetal, or other bearing types can be difficult to utilize due to friction.

Caster wheel diameter is relatively small relative to total height. In certain exemplary embodiments, wheels can have difficulty driving over minor defects, which can lead to dolly stoppages.

When a loaded dolly is pushed to the left, then the wheels caster to the right, this means a left-most wheel's fulcrum point to the ground can tip the load on it's side during such turns as a function of caster offset position. If a caster fails, the caster can tip the load even farther.

Large caster offset results in wheels jamming into crate cross-members, thereby constraining movement.

Certain exemplary embodiments comprise planetary roller casters.

Rolling and castering elements each manage one plane on a radial load, planetary to the rolling wheel. Rolling and castering elements are subject to radial loads, not bending loads, on the rollers. In such embodiments, acetal and/or bronze rollers can be utilized.

Wheel diameters can have approximately 95% of their height off of the ground, thus taking advantage of the approach geometry of a large wheel facing a given obstacle height without the structure being too tall.

Certain exemplary embodiments function with less caster offset than other designs. If a component fails, the wheel being 95% of the gap height, serves as an immediate redundancy of support by touching the load directly.

Certain exemplary planetary arrangements provide that wheels do not exceed perimeter components, thus not striking a cross member.

Figure 1:
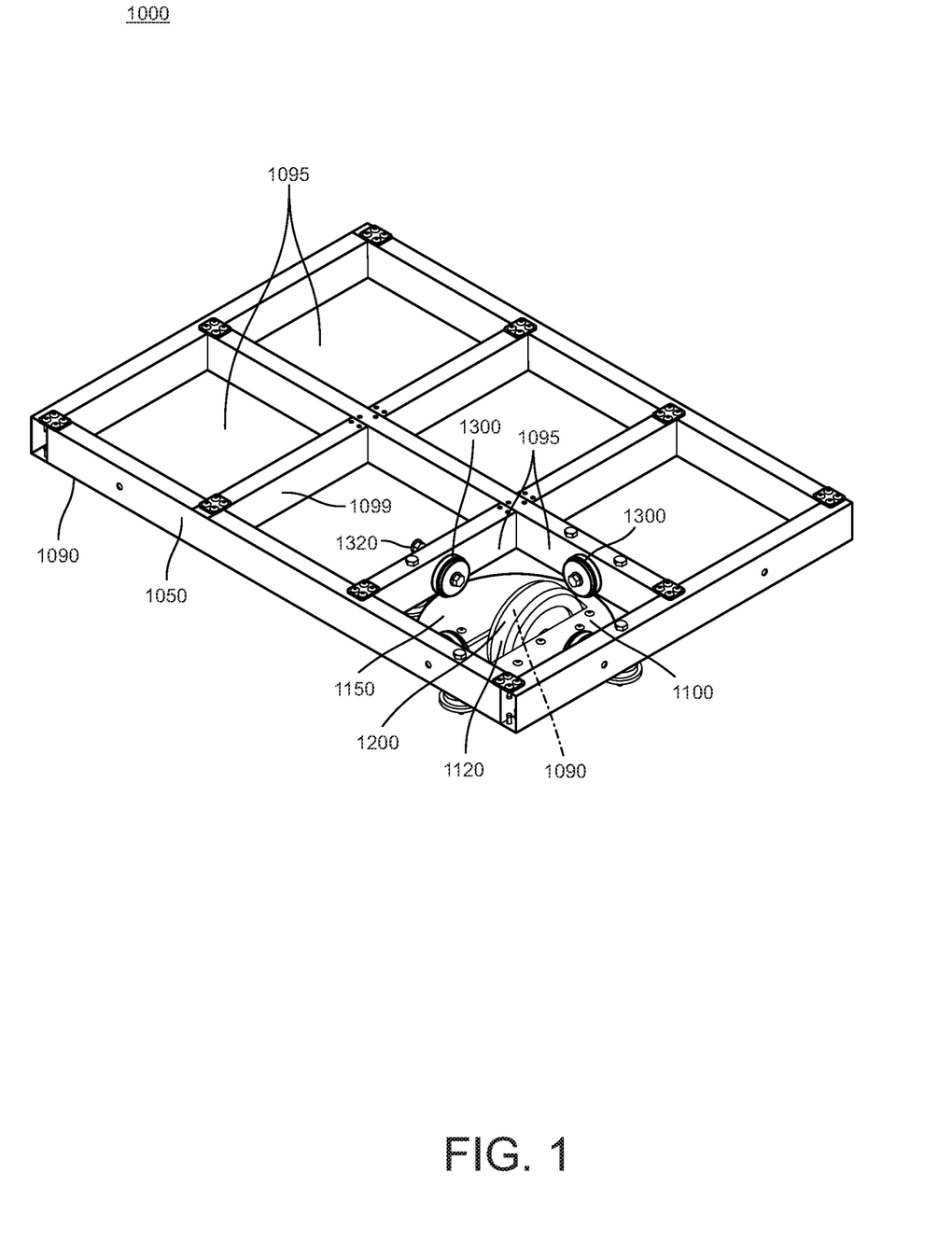
FIG. 1 is a photograph of a perspective view of an exemplary embodiment of a system 1000.

FIG. 1 is a photograph of a perspective view of an exemplary embodiment of a system 1000, which comprises a dolly 1050, a planetary disc 1100 coupled to a caster wheel 1200. System 1000 comprises a plurality of rollers 1300 that distribute any load placed on system 1000 over planetary disc 1100 thereby reducing a probability of failure of caster wheel 1200 or a support thereof.

Dolly 1050 comprises:
a frame 1090, which comprises a plurality of cells 1095;
a set of guide rollers (see, e.g., guide roller 1400 of FIG. 2), the set of guide rollers coupled to frame 1090;
planetary disc 1100, which is constrained within a cell 1099 of plurality of cells 1095 via the set of guide rollers;
plurality of rollers 1300, each of which is coupled to cell 1099 of plurality of cells 1095, wherein:
each of plurality of rollers 1300 contacts a surface 1150 of planetary disc 1100;
plurality of rollers 1300 is constructed to distribute a load placed on dolly 1050 over surface 1150 of planetary disc 1100, thereby reducing a probability of failure of dolly 1050; and
each of plurality of rollers 1300 is coupled to frame 1090 via a fastener 1320; and
a caster wheel 1200, which is coupled to planetary disc 1100.

Planetary disc 1100 is one of a plurality of planetary discs comprised by dolly 1050. Planetary disc 1100 defines a slot 1120, which slot 1120 is constructed to allow rotation of caster wheel 1200.

Each of plurality of cells 1095 of dolly 1050 houses at least one planetary disc axis 1900, whether there be one or several planetary discs present therein.

Figure 2:
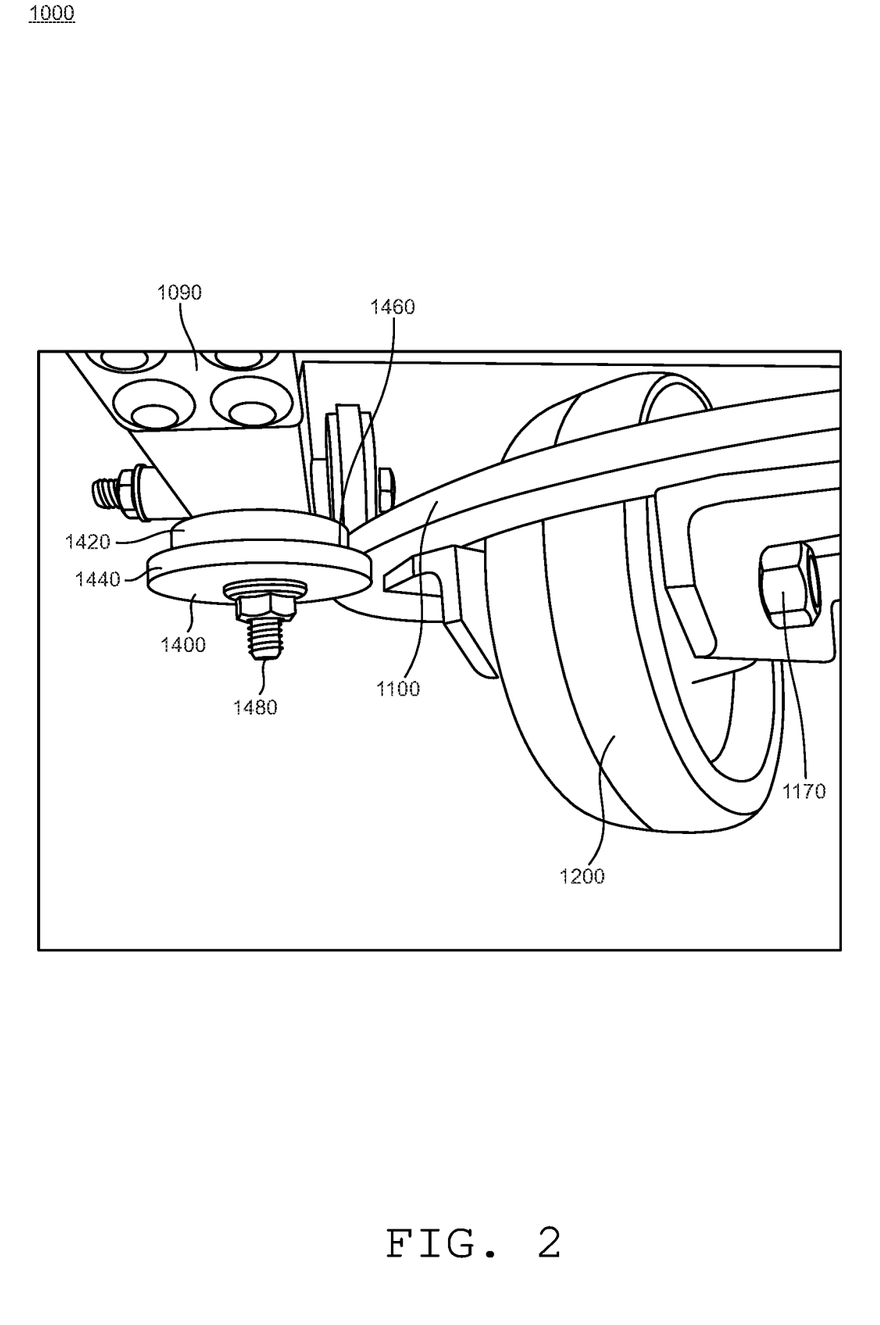
FIG. 2 is a photograph of a perspective view of a portion of exemplary system 1000.

FIG. 2 is a photograph of a perspective view of a portion of exemplary system 1000, which illustrates a guide roller 1400 that aligns and supports planetary disc 1100 as caster wheel 1200 rolls.

Each of the set of guide rollers comprises a smaller diameter cylindrical portion 1420 and a larger diameter cylindrical portion 1440. A junction (see, e.g., junction 4850 of FIG. 11) of smaller diameter cylindrical portion 1420 and larger diameter cylindrical portion 1440 forming a shelf 1460. Wherein planetary disc 1100 contacts shelf 1460 and rotates via contact with smaller diameter cylindrical portion 1420.

Caster wheel 1200 is coupled to planetary disc 1100 via a fastener 1170.

Each of the set of guide rollers is coupled to frame 1090 via a fastener 1480.

Figure 3:
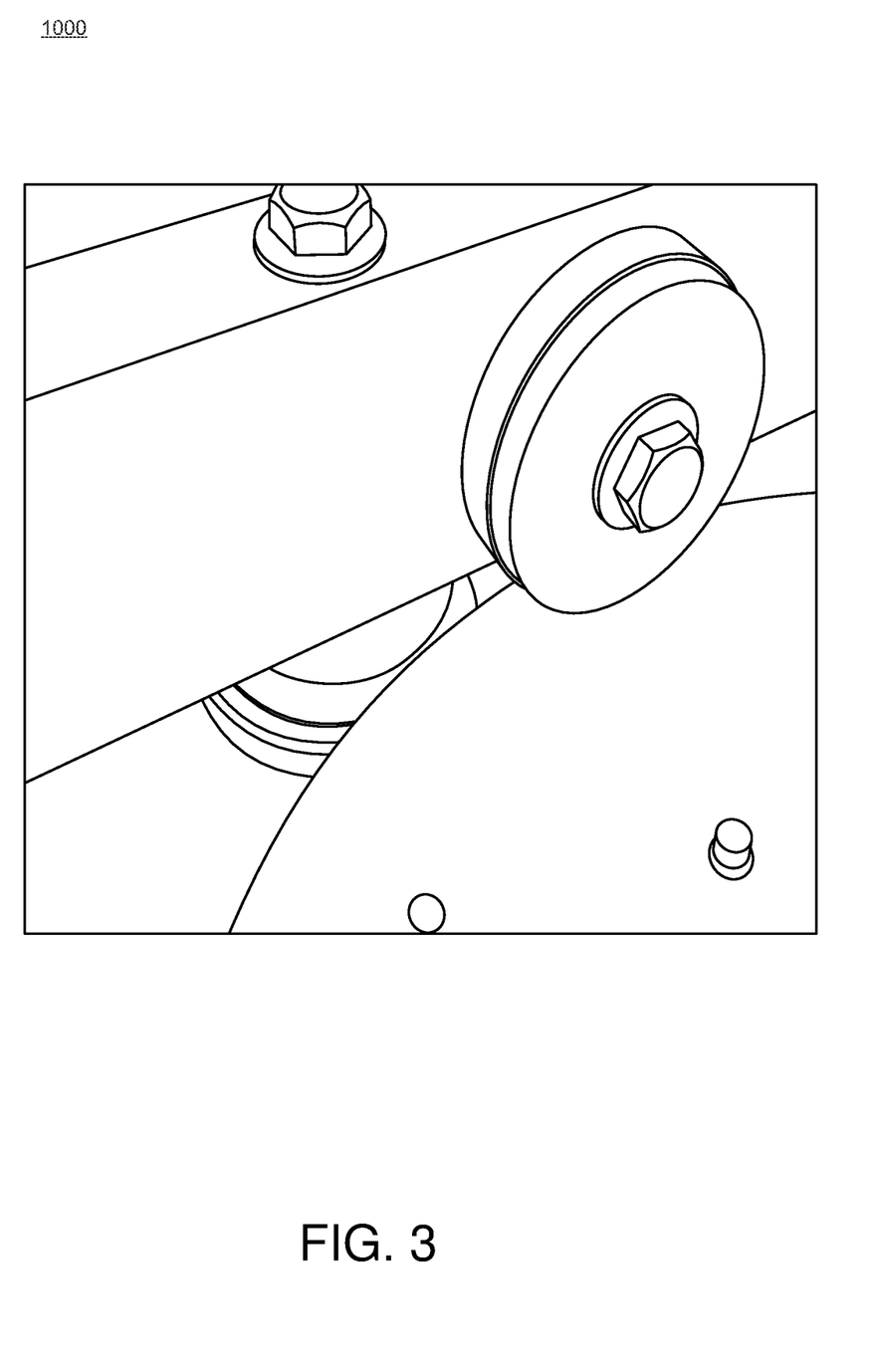
FIG. 3 is a photograph of a perspective view of a portion of exemplary system 1000.

FIG. 3 is a photograph of a perspective view of a portion of exemplary system 1000.

Figure 4:
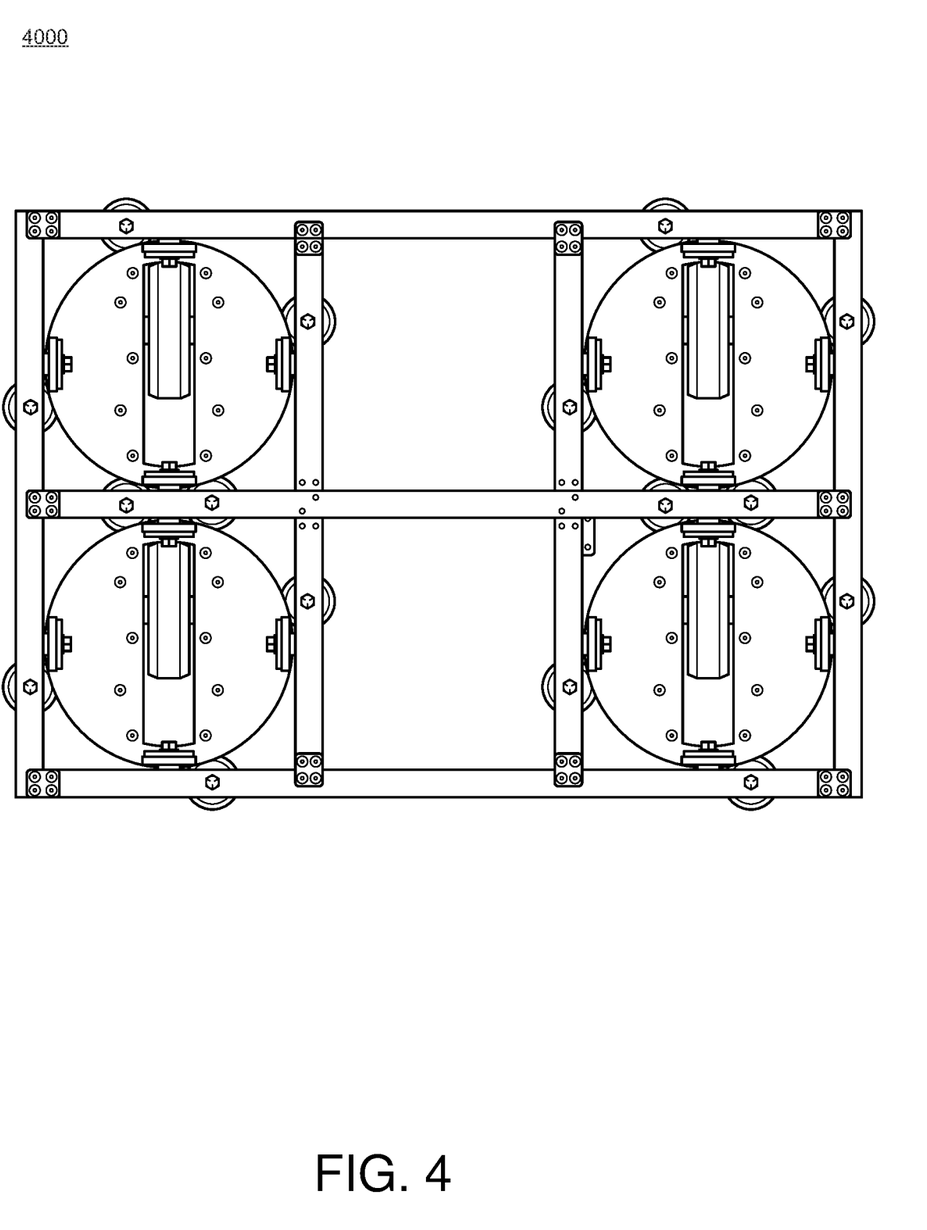
FIG. 4 is a plan view of an exemplary embodiment of a system 4000.

FIG. 4 is a plan view of an exemplary embodiment of a system 4000.

Figure 5:
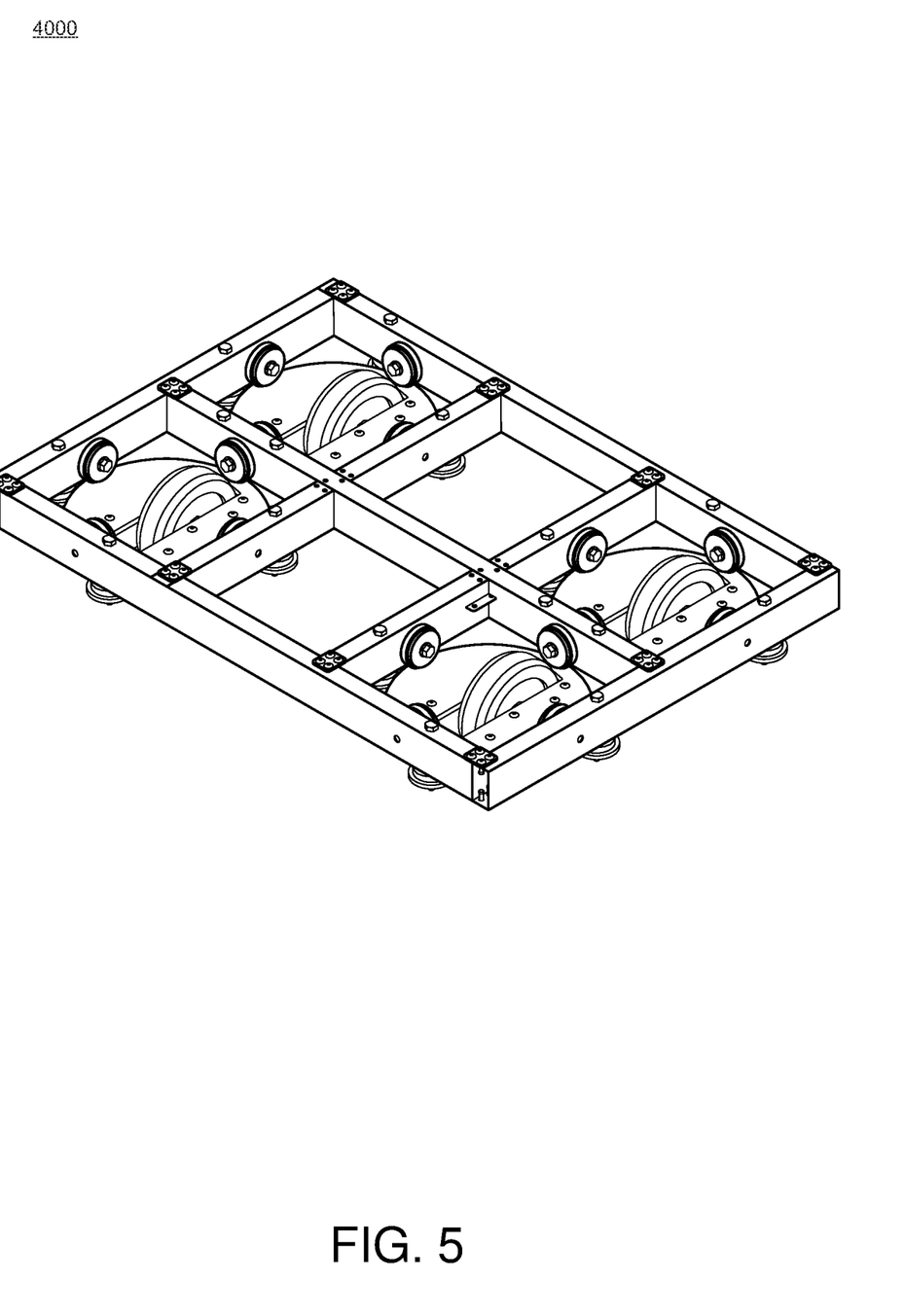
FIG. 5 is a perspective view of exemplary system 4000.
Figure 6:
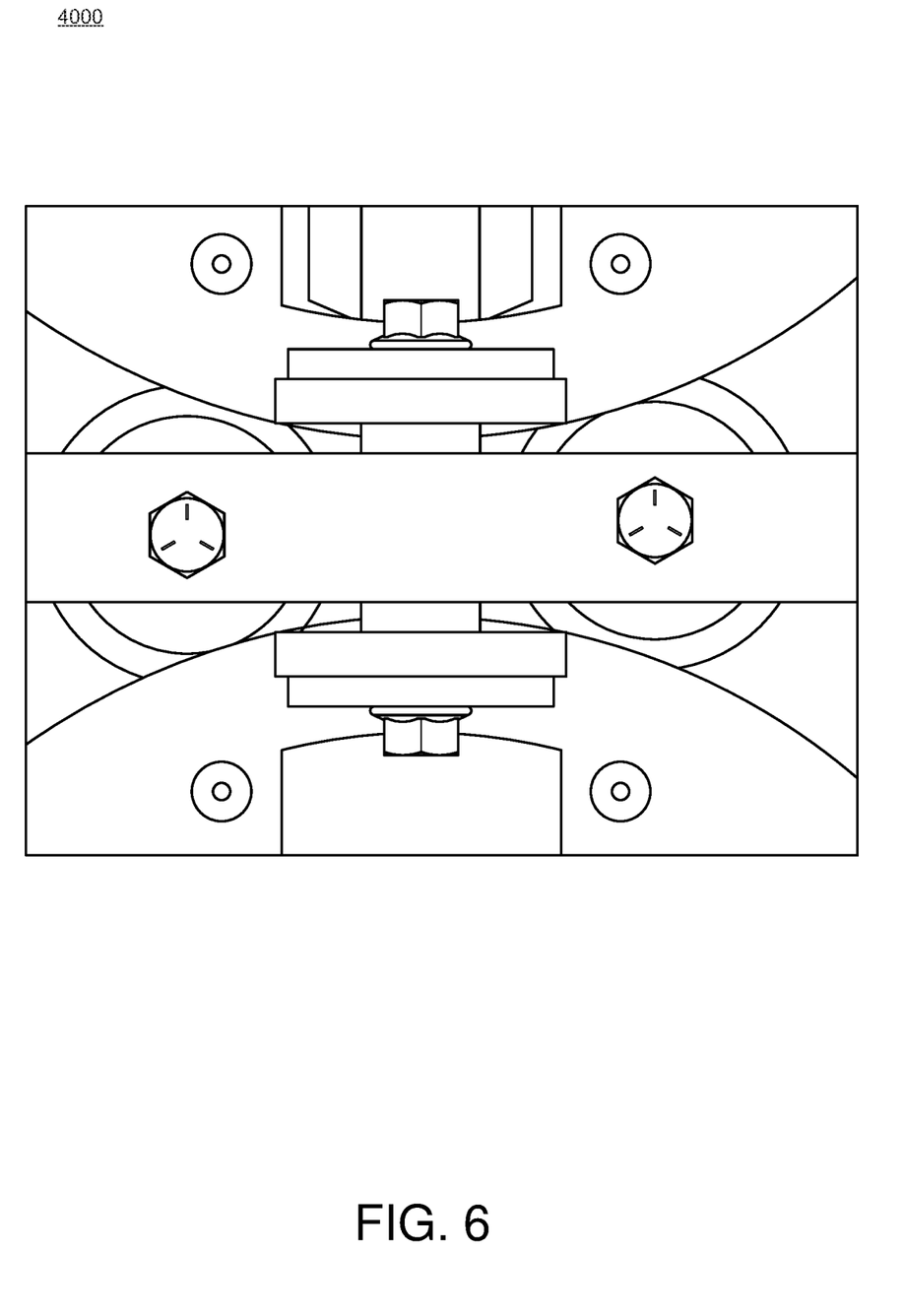
FIG. 6 is a sectional view of exemplary system 4000.
Figure 7:
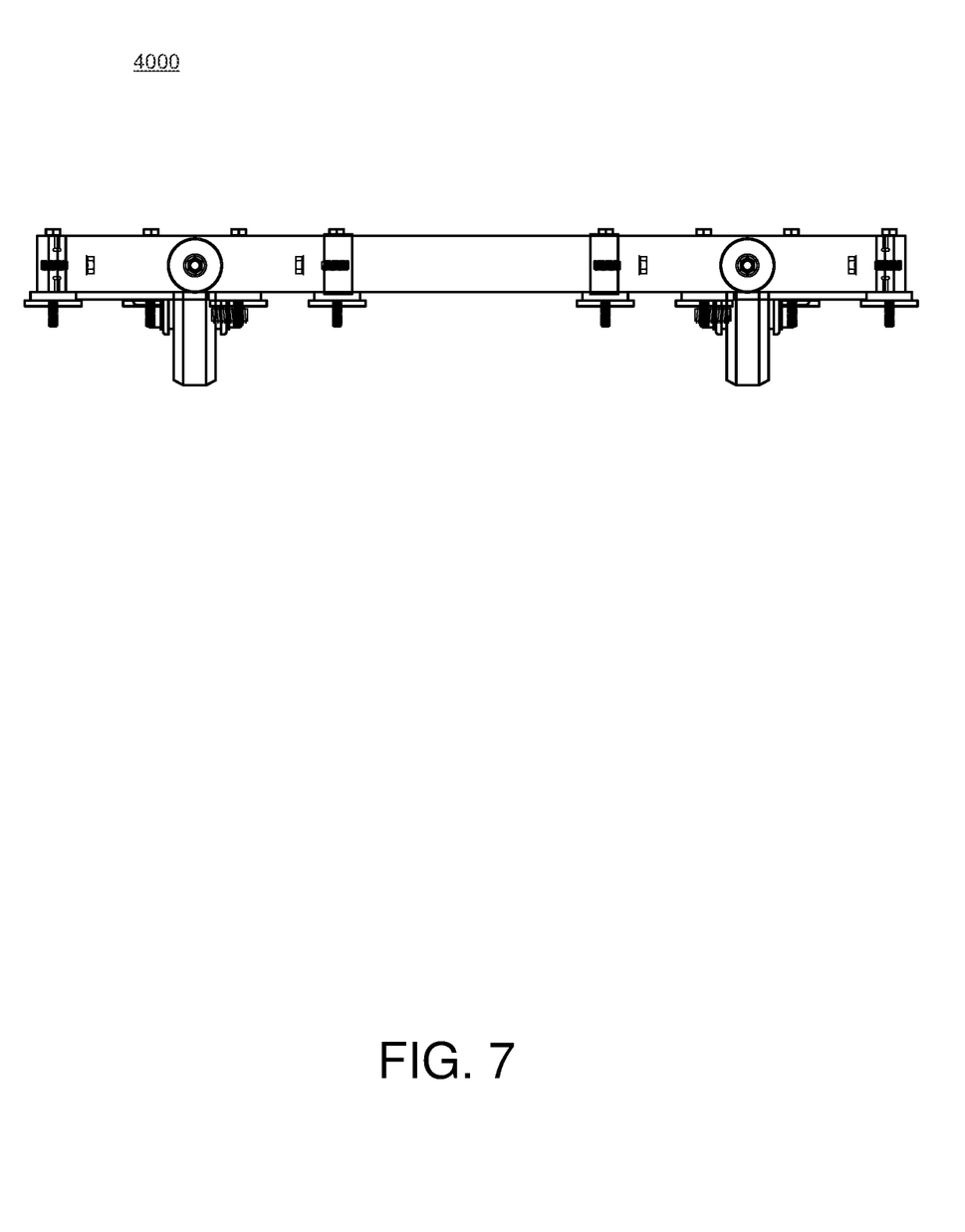
FIG. 7 is a side view of exemplary system 4000.
Figure 8:
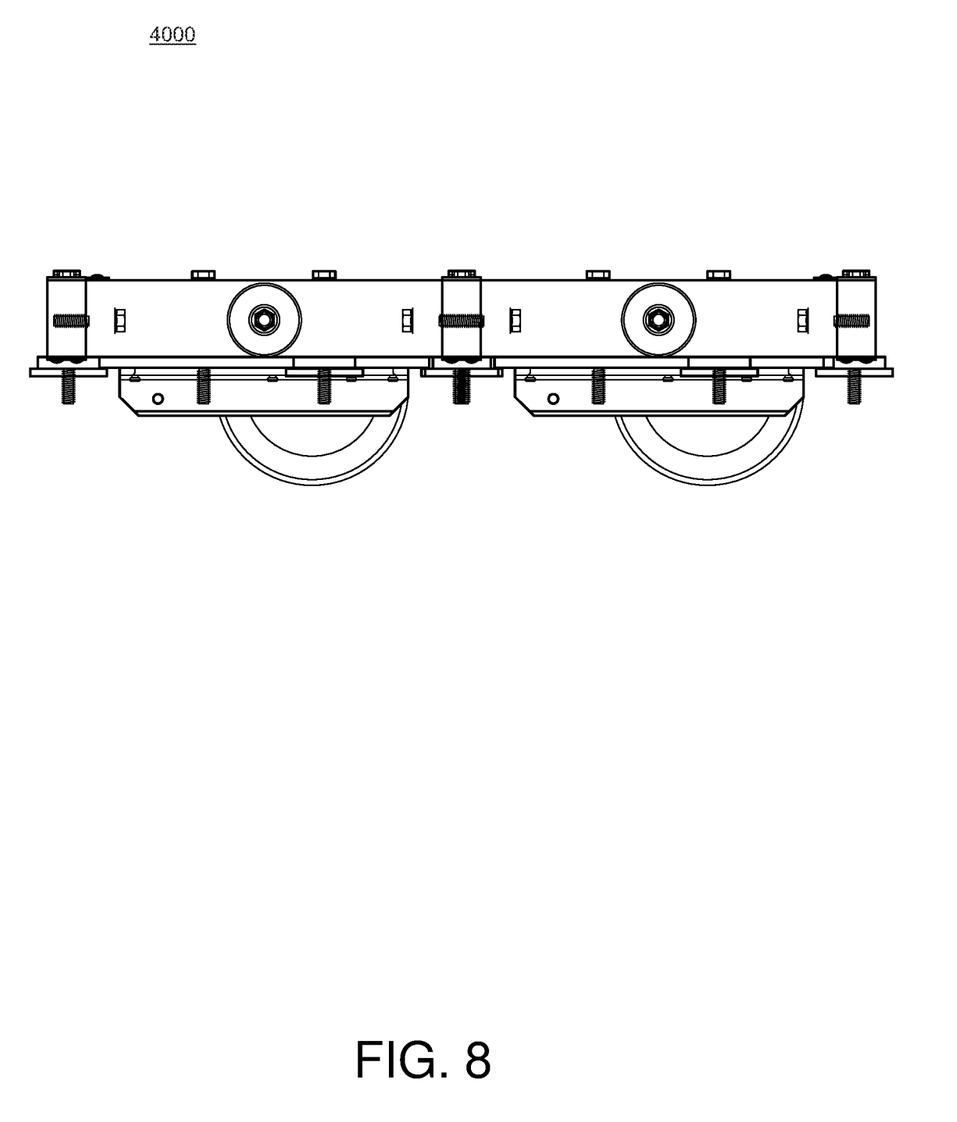
FIG. 8 is an end view of exemplary system 4000.
Figure 9:
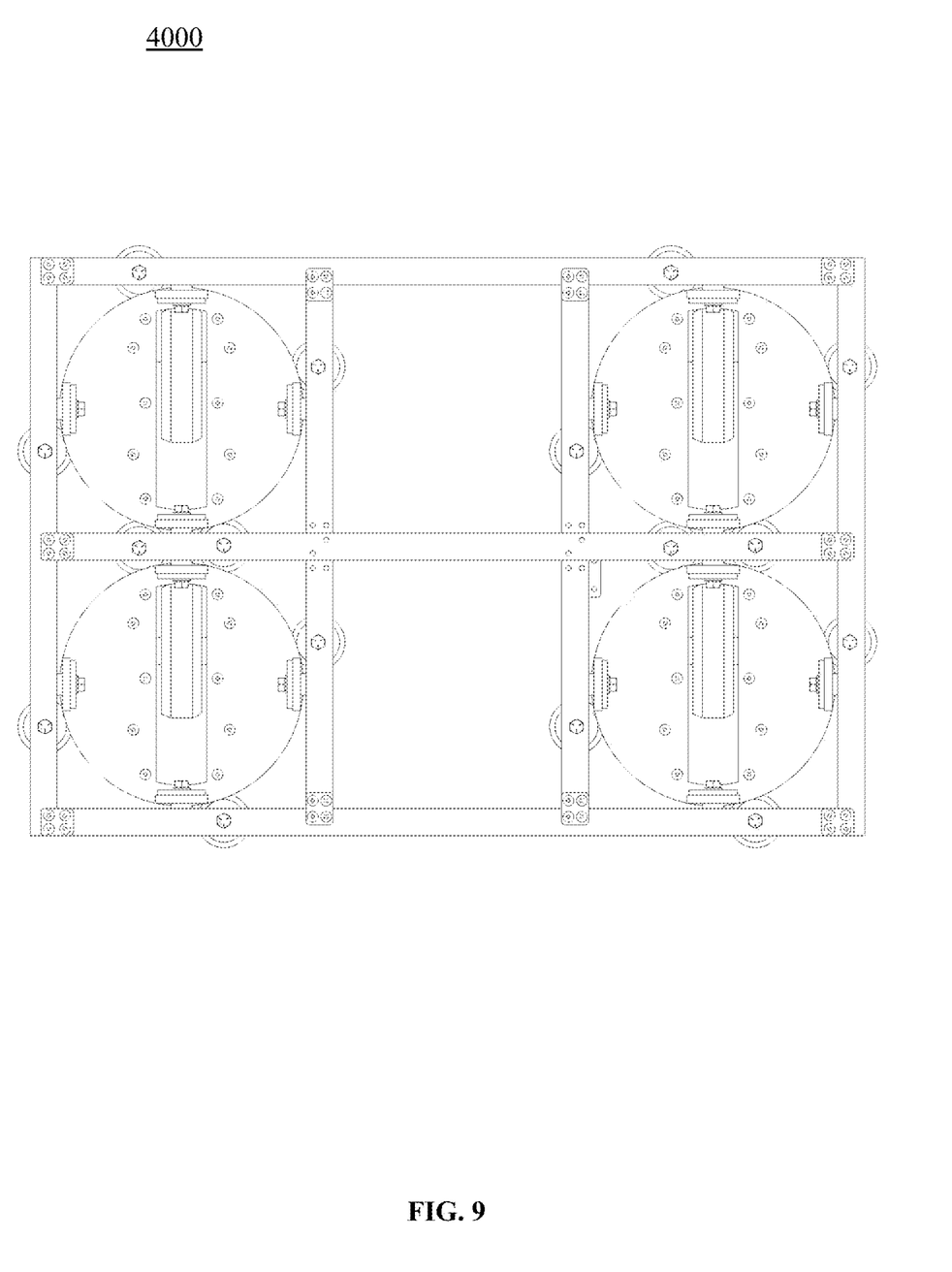
FIG. 9 is a plan view of exemplary system 4000.
Figure 10:
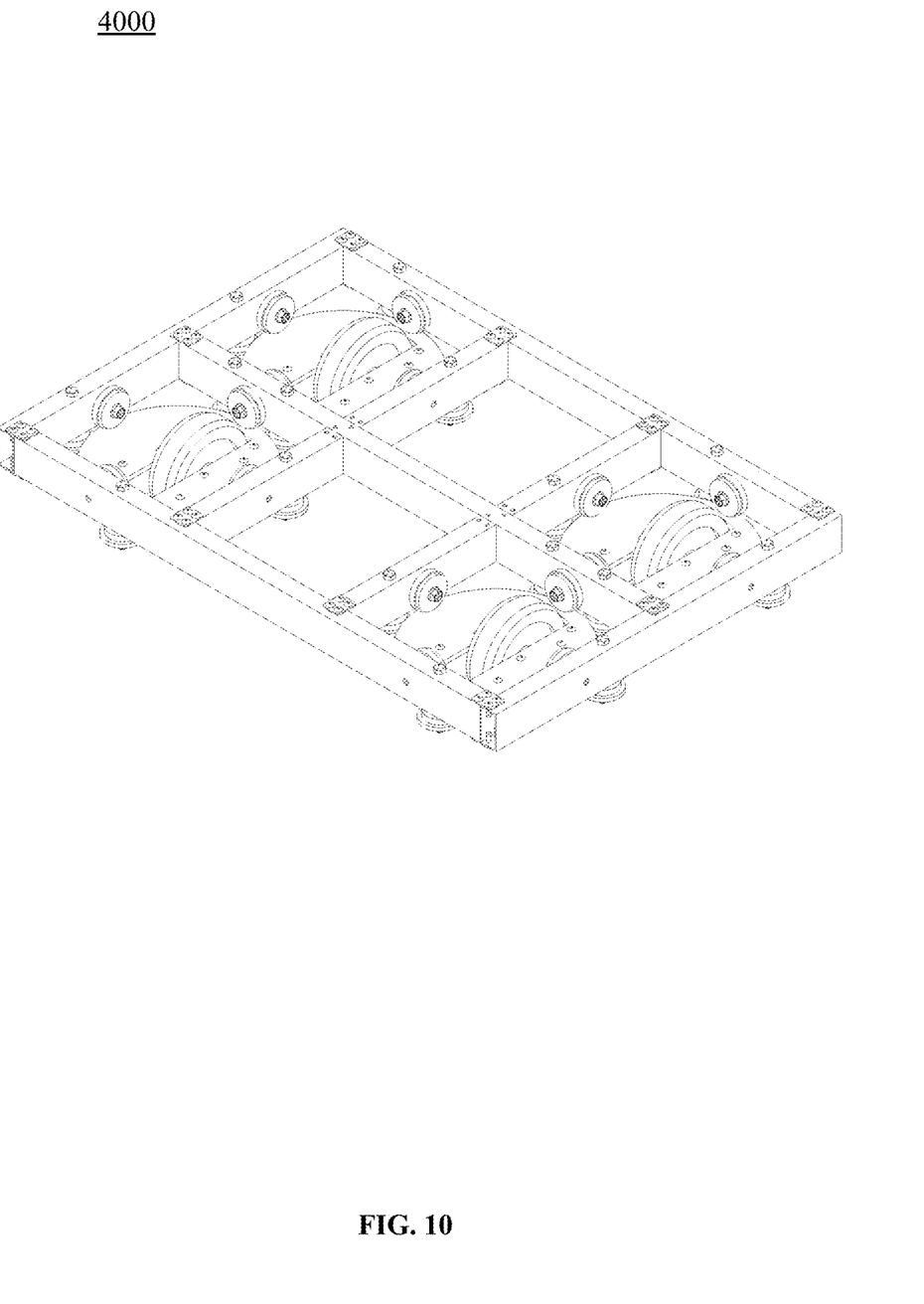
FIG. 10 is a perspective view of exemplary system 4000.
Figure 11:
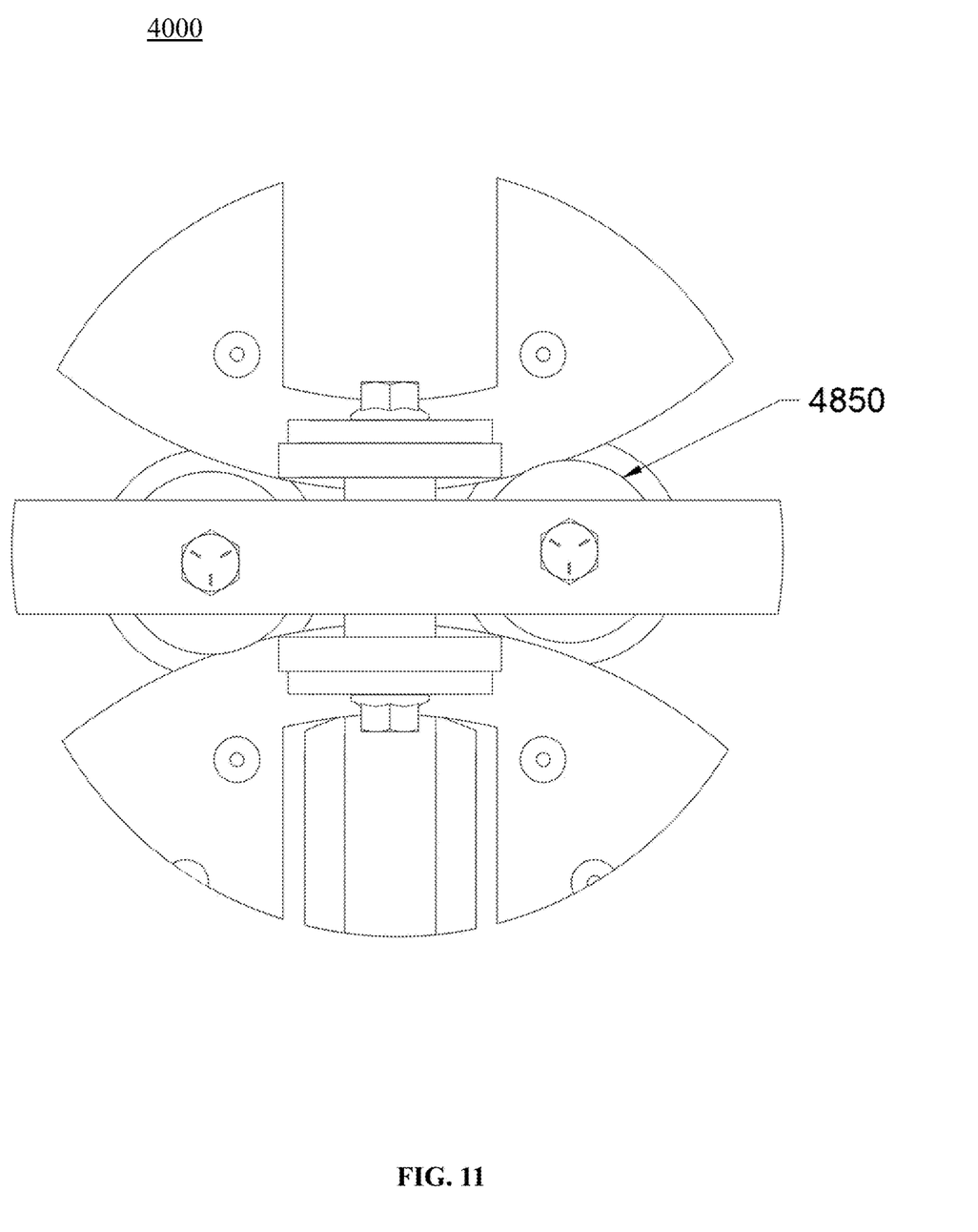
FIG. 11 is a sectional view of exemplary system 4000.
Figure 12:
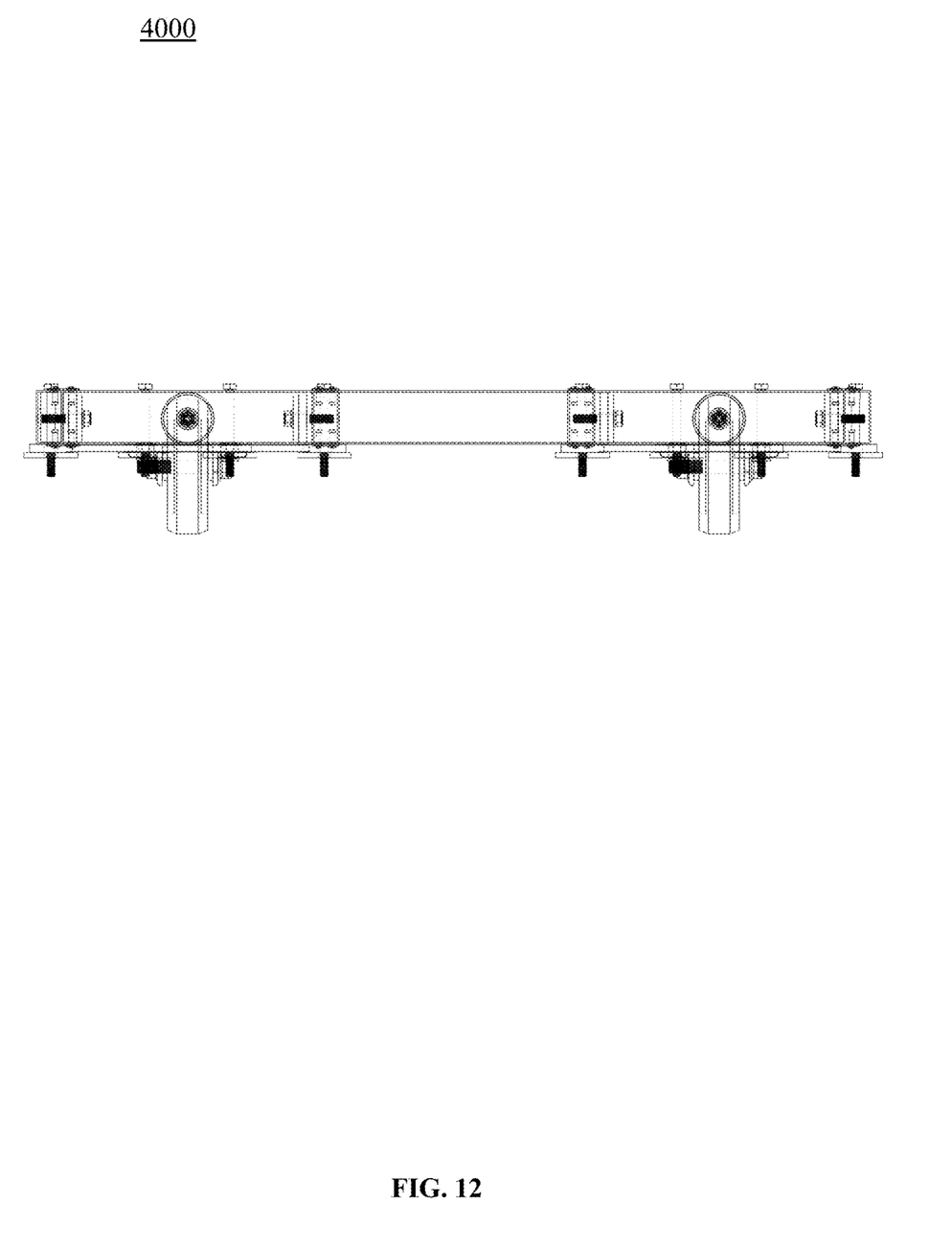
FIG. 12 is a side view of exemplary system 4000.
Figure 13:
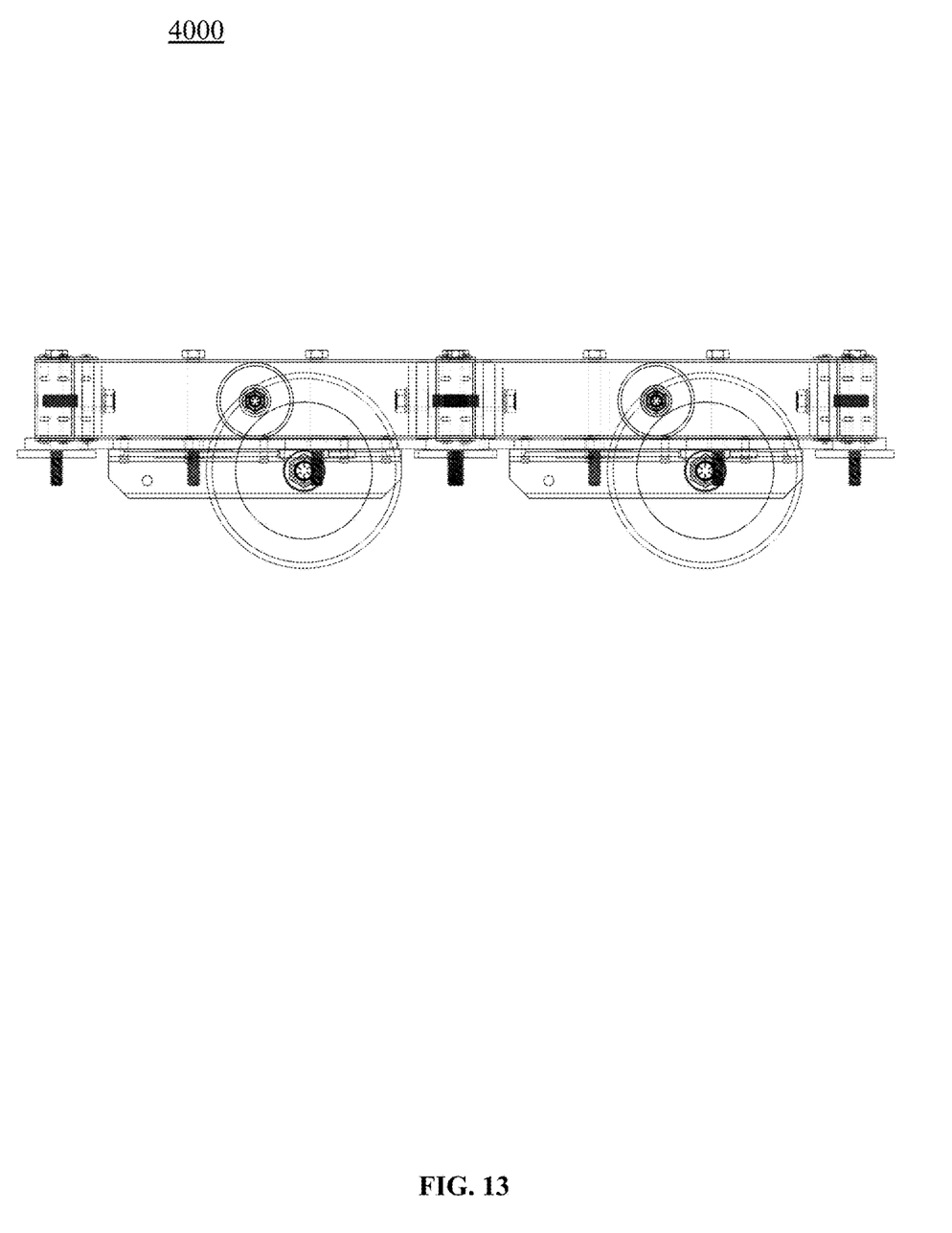
FIG. 13 is an end view of exemplary system 4000.
Figure 14:
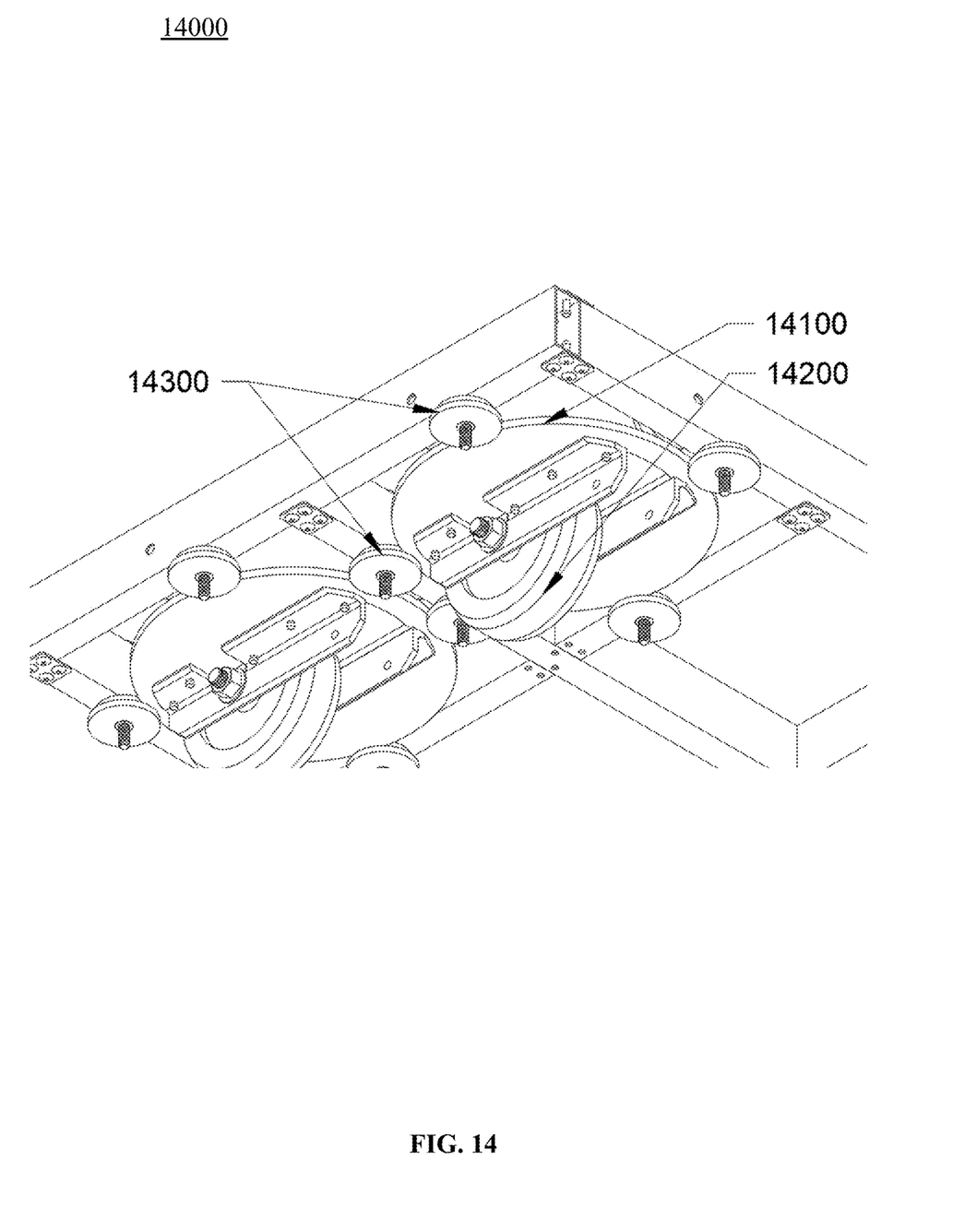
FIG. 14 is a perspective view of exemplary system 14000.

FIG. 5 is a perspective view of exemplary system 4000.
FIG. 6 is a sectional view of exemplary system 4000.
FIG. 7 is a side view of exemplary system 4000.
FIG. 8 is an end view of exemplary system 4000.
FIG. 9 is a plan view of exemplary system 4000.
FIG. 10 is a perspective view of exemplary system 4000.
FIG. 11 is a sectional view of exemplary system 4000.
FIG. 12 is a side view of exemplary system 4000.
FIG. 13 is an end view of exemplary system 4000.
FIG. 14 is a perspective view of exemplary system 14000, which comprises a planetary disc 14100 coupled to a caster wheel 14200. System 14000 comprises a set of guide rollers 14300 that align planetary disc 14100 and allow planetary disc 14100 to rotate.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

axis—a line about which a body rotates.
can—is capable of, in at least some embodiments.
caster—a system comprising a wheel and a bracket coupling the wheel to a dolly.
cell—a bounded space.
comprising—including but not limited to.
configure—to make suitable or fit for a specific use or situation.
connect—to join or fasten together.
constrain—to restrict movement.
constructed to—made to and/or designed to.
contact—to touch.
couple—to link in some fashion.
coupleable—capable of being joined, connected, and/or linked together.
cylindrical—having a shape of a surface or solid bounded by two parallel planes and generated by a straight line moving parallel to the given planes and tracing a curve bounded by the planes and lying in a plane perpendicular or oblique to the given planes.
define—to establish the outline, form, or structure of.
device—a machine, manufacture, and/or collection thereof.
diameter—a length of a line passing through the center of a substantially circular object and meeting the circumference or surface at each end.
distribute—to spread out.
dolly—a cart comprising a set of wheels that is constructed to move loads.
failure—a cessation of proper functioning or performance.
fastener—one (or more) restraints that attach to, extend through, penetrate, and/or hold something. For example, a fastener can be one (or more) bolt and nut assembly, rivet, weldment, nail, screw, peg, staple, clip, buckle, clasp, clamp, hook and loop assembly, adhesive, and/or plastic push rivet, etc.
form—to create.
frame—a supporting structure.
guide—(n) an object that constrains motion to a desired direction; (v) to constrains motion to a desired direction.
install—to connect or set in position and prepare for use.
junction—a place of meeting.
larger—bigger in size.
load—a mass or weight supported by something.
may—is allowed and/or permitted to, in at least some embodiments.
place—to put something in a predetermined location.
planetary disc—a flat round object that comprises a surface upon which a plurality of rollers travel.
plurality—the state of being plural and/or more than one.
portion—a part of a whole.
predetermined—established in advance.
probability—a ratio of the number of outcomes in an exhaustive set of equally likely outcomes that produce a given event to the total number of possible outcomes.
provide—to furnish, supply, give, and/or make available.
receive—to get, take, acquire, and/or obtain.
reduce—to diminish.
roller—a revolving cylinder on which something is moved.
rotate—to move or cause to move around an axis or center.
set—a related plurality.
shelf—a projecting part of something that comprises a substantially planar surface.
slot—a narrow opening or groove.
smaller—lesser in size.
substantially—to a great extent or degree.
support—to bear the weight of, especially from below.
surface—the outer boundary of an object or a material layer.
system—a collection of mechanisms, devices, machines, articles of manufacture, processes, data, and/or instructions, the collection designed to perform one or more specific functions.
threaded fastener—one (or more) restraints comprising projecting helical ribs via which parts can be screwed together, which restraints attach to, extend through, penetrate, and/or hold something and engage via. For example, a threaded fastener can be one (or more) of a bolt, a bolt and nut assembly and/or a screw, etc.
via—by way of and/or utilizing wheel—a solid disk or a rigid circular ring connected by spokes to a hub, designed to turn around an axle passed through the center.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A dolly comprising:
a frame, the frame comprising a plurality of cells;
a set of guide rollers, the set of guide rollers coupled to the frame;
a planetary disc, the planetary disc constrained within a cell of the plurality of cells via the set of guide rollers;
a plurality of rollers, the plurality of rollers coupled to the cell of the plurality of cells, each of the plurality of rollers contacting a surface of the planetary disc, the plurality of rollers constructed to distribute a load placed on the dolly over the surface of the planetary disc, thereby reducing a probability of failure of the dolly; and
a caster wheel, the caster wheel coupled to the planetary disc.

2. The dolly of claim 1, wherein:
the planetary disc is one of a plurality of planetary discs.

3. The dolly of claim 1, wherein:
the planetary disc defines a slot, the slot constructed to allow rotation of the caster wheel.

4. The dolly of claim 1, wherein:
each of the plurality of cells within the dolly houses at least one planetary disc axis, whether there be one or several planetary discs present therein.

5. The dolly of claim 1, wherein:
each of the set of guide rollers comprises a smaller diameter cylindrical portion and a larger diameter cylindrical portion, a junction of the smaller diameter cylindrical portion and the larger diameter cylindrical portion forming a shelf, wherein the planetary disc contacts the shelf and rotates via contact with the smaller diameter cylindrical portion.

6. The dolly of claim 1, wherein:
the caster wheel is coupled to the planetary disc via a fastener.

7. The dolly of claim 1, wherein:
each of the set of guide rollers is coupled to the frame via a fastener.

8. The dolly of claim 1, wherein:
each of the set of rollers is coupled to the frame via a fastener.

* * * * *